(12) United States Patent
Park et al.

(10) Patent No.: US 10,388,150 B2
(45) Date of Patent: Aug. 20, 2019

(54) ELECTRONIC APPARATUS AND CONTROLLING METHOD THEREOF

(71) Applicant: SAMSUNG ELECTRONICS CO., LTD., Suwon-si (KR)

(72) Inventors: Jong-jin Park, Suwon-si (KR); Young-in Park, Gunpo-si (KR); Min-sup Kim, Suwon-si (KR); Hyun-kyu Yun, Seoul (KR); Won-jae Lee, Ulsan (KR); Dae-woo Cho, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/422,924

(22) Filed: Feb. 2, 2017

(65) Prior Publication Data
US 2018/0012485 A1    Jan. 11, 2018

(30) Foreign Application Priority Data
Jul. 5, 2016    (KR) .................... 10-2016-0084735

(51) Int. Cl.
*G08C 23/04* (2006.01)
*H04N 21/436* (2011.01)
(Continued)

(52) U.S. Cl.
CPC ....... *G08C 23/04* (2013.01); *H04N 21/43615* (2013.01); *H04N 21/485* (2013.01);
(Continued)

(58) Field of Classification Search
CPC .... G08C 23/04; G08C 17/02; G08C 2201/92; G08C 2201/21; G08C 2201/40;
(Continued)

(56) References Cited

U.S. PATENT DOCUMENTS

| 8,754,992 B1* | 6/2014 | Schulze ........... H04N 21/42226 340/12.22 |
| 2002/0171624 A1* | 11/2002 | Stecyk ................ H04L 12/2805 345/156 |

(Continued)

FOREIGN PATENT DOCUMENTS

| EP | 2 892 039 A1 | 7/2015 |
| EP | 3 193 497 A1 | 7/2017 |

(Continued)

OTHER PUBLICATIONS

International Search Report and Written Opinion (PCT/ISA/210 & PCT/ISA/237) dated May 23, 2017, issued by the International Searching Authority in counterpart International Application No. PCT/KR2017/001608.

(Continued)

*Primary Examiner* — Ted M Wang
(74) *Attorney, Agent, or Firm* — Sughrue Mion, PLLC

(57) ABSTRACT

An electronic apparatus includes a storage configured to store a plurality of IR code sets corresponding to a plurality of external electronic apparatuses, a communicator configured to perform communication with at least one of the plurality of external electronic apparatuses and a remote control apparatus, and a processor configured to, in response to an operation corresponding to a test code included in one of the plurality of IR code sets being performed in the external electronic apparatus, determine an IR code set including the test code as an IR code set corresponding to the external electronic apparatus, and transmit, to the remote control apparatus, a command to map the determined IR code set to the remote control apparatus.

10 Claims, 12 Drawing Sheets

(51) Int. Cl.
*H04N 21/485* (2011.01)
*H04N 21/422* (2011.01)

(52) U.S. Cl.
CPC ..... *G08C 2201/21* (2013.01); *G08C 2201/40* (2013.01); *G08C 2201/92* (2013.01); *H04N 21/42225* (2013.01); *H04N 21/42226* (2013.01)

(58) Field of Classification Search
CPC ...... H04B 10/114; H04B 10/1141; H03J 9/06; H04N 21/43615; H04N 21/485; H04N 21/42225; H04N 21/42226
See application file for complete search history.

(56) References Cited

U.S. PATENT DOCUMENTS

| | | | | |
|---|---|---|---|---|
| 2003/0103088 | A1* | 6/2003 | Dresti | G06F 3/0481 715/835 |
| 2008/0204269 | A1* | 8/2008 | Wu | G08C 23/04 340/4.3 |
| 2010/0053468 | A1* | 3/2010 | Harvill | H04N 5/4403 348/734 |
| 2014/0064735 | A1 | 3/2014 | Thompson et al. | |
| 2015/0234370 | A1 | 8/2015 | Kim | |
| 2016/0119626 | A1 | 4/2016 | Slupik et al. | |

FOREIGN PATENT DOCUMENTS

| | | |
|---|---|---|
| EP | 3 324 379 A1 | 5/2018 |
| KR | 19960007580 B1 | 6/1996 |
| KR | 1020060014953 A | 2/2006 |
| KR | 102007002833 A | 3/2007 |
| KR | 1020070028833 A | 3/2007 |
| KR | 101039757 B1 | 6/2011 |
| KR | 1020130064973 A | 6/2013 |
| KR | 1020140094244 A | 7/2014 |
| WO | 2011068270 A1 | 6/2011 |
| WO | 2011112011 A2 | 9/2011 |
| WO | 2015012469 A1 | 1/2015 |

OTHER PUBLICATIONS

Communication dated Aug. 23, 2018, issued by the European Patent Office in counterpart European Application No. 17824379.6.

* cited by examiner

ELECTRONIC APPARATUS AND CONTROLLING METHOD THEREOF

CROSS-REFERENCE TO RELATED APPLICATION

This application claims priority from Korean Patent Application No. 10-2016-0084735, filed on Jul. 5, 2016 in the Korean Intellectual Property Office, the disclosure of which is incorporated herein by reference in its entirety.

BACKGROUND

1. Field

Apparatuses and methods consistent with exemplary embodiments relate to an electronic apparatus which identifies an external electronic apparatus connected to the electronic apparatus and a controlling method thereof.

2. Description of the Related Art

With the developments of electronic technologies, various types of electronic devices have been used in various fields. Particularly, because a variety of external electronic devices may provide content, it is necessary to determine which device is an external electronic device currently providing the content and/or information, and a convenient means of controlling the determined external electronic device is needed.

In the related art, an external electronic device is identified by using a High-Definition Multimedia Interface (HDMI) Consumer Electronics Control (CEC), an Infoframe, or the like, or by referring to information about an external electronic device included in video data provided by the external electronic device, and the identified external electronic device is controlled using an integrated remote controller.

However, even when using HDMI CEC, Infoframe, etc., many external electronic devices do not have identification information, and in the case of using information about external electronic devices included in the video data, a program needs to be executed that uses many processes and affects other processes.

Accordingly, there is a need for methods and apparatuses for identifying external electronic devices with a lighter load process and for controlling the identified external electronic devices using an integrated remote controller.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments may provide an electronic apparatus which identifies an external electronic apparatus connected to the electronic apparatus and mapping an infrared (IR) code set corresponding to the identified external electronic apparatus to a remote control apparatus and a controlling method thereof.

According to an aspect of an exemplary embodiment, there is provided an electronic apparatus including a storage configured to store a plurality of IR code sets corresponding to each of a plurality of external electronic apparatuses, a communicator configured to perform communication with at least one of the plurality of external electronic apparatuses and a remote control apparatus, and a processor configured to, in response to an operation corresponding to a test code included in one of the plurality of IR code sets being performed in the external electronic apparatus according to a certain event, determine an IR code set including the test code as an IR code set corresponding to the external electronic apparatus and transmit a command to map the determined IR code set to the remote control apparatus to the remote control apparatus.

The test code may be a volume control code, and the processor, in response to an operation corresponding to the volume control code being performed in the external electronic apparatus, may determine an IR code set including the volume control code as an IR code set corresponding to the external electronic apparatus.

The processor, in response to the certain event occurring, may transmit the test code to the remote control apparatus, and in response to an operation corresponding to the test code being performed in the external electronic apparatus, may determine an IR code set including the test code as an IR code set corresponding to the external electronic apparatus.

The processor may transmit a test code included in one of the plurality of IR code sets to the remote control apparatus, and in response to an operation corresponding to the test code not being performed in the external electronic apparatus, may transmit a test code included in another one of the plurality of IR code sets to the remote control apparatus.

The processor, in response to an operation corresponding to the test code being performed in the external electronic apparatus, may retransmit the test code to the remote control apparatus, and in response to the corresponding operation according to the retransmission of the test code being performed more than a certain number, may determine an IR code set including the test code as an IR code set corresponding to the external electronic apparatus.

The processor may transmit to the remote control apparatus a signal for executing a control command corresponding to the test code along with a test code included in one of the plurality of IR code sets.

The certain event may be at least one of an event in which the external electronic apparatus is connected to the electronic apparatus and an event in which a user command to identify the external electronic apparatus connected to the electronic apparatus is received.

The processor, in response to an operation corresponding to the test code being performed in the external electronic apparatus within a certain time after the test code is received from another remote control apparatus, may determine an IR code set including the test code as an IR code set corresponding to the external electronic apparatus.

The processor, if a number of an operation corresponding to the test code being performed in the external electronic apparatus within a certain time after the test code is received again is more than a certain number, may determine an IR code set including the test code as an IR code set corresponding to the external electronic apparatus.

The command to map the determined IR code set to the remote control apparatus may include at least one of the determined IR code set including the test code and identification information of the external electronic apparatus corresponding to the determined IR code set including the test code.

According to an aspect of an exemplary embodiment, there is provided a controlling method of an electronic apparatus which stores a plurality of IR code sets corresponding to each of a plurality of external electronic apparatuses, including, in response to an operation corresponding to a test code included in one of the plurality of IR code sets being performed in an external electronic apparatus which performs communication with the electronic apparatus according to a certain event, determining an IR code set including the test code as an IR code set corresponding to the external electronic apparatus and transmitting a command to map the determined IR code set to a remote control apparatus to the remote control apparatus.

The test code may be a volume control code, and the determining may include, in response to an operation corresponding to the volume control code being performed in the external electronic apparatus, determining an IR code set including the volume control code as an IR code set corresponding to the external electronic apparatus.

The method may include, in response to the certain event occurring, transmitting the test code to the remote control apparatus, and the determining may include, in response to an operation corresponding to the test code being performed in the external electronic apparatus, determining an IR code set including the test code as an IR code set corresponding to the external electronic apparatus.

The method may further include, in response to an operation corresponding to the test code not being performed in the external electronic apparatus, transmitting a test code included in another one of the plurality of IR code sets to the remote control apparatus.

The determining may include, in response to an operation corresponding to the test code being performed in the external electronic apparatus, retransmitting the test code to the remote control apparatus, and in response to the corresponding operation according to the retransmission of the test code being performed more than a certain number, determining an IR code set including the test code as an IR code set corresponding to the external electronic apparatus.

The transmitting the test code to the remote control apparatus may include transmitting to the remote control apparatus a signal for executing a control command corresponding to the test code along with a test code included in one of the plurality of IR code sets.

The certain event may be at least one of an event in which the external electronic apparatus is connected to the electronic apparatus and an event in which a user command to identify the external electronic apparatus connected to the electronic apparatus is received.

The method may further include receiving the test code from another remote control apparatus, and the determining may include receiving the test code, and in response to an operation corresponding to the test code being performed in the external electronic apparatus within a certain time after the test code is received from another remote control apparatus, determining an IR code set including the test code as an IR code set corresponding to the external electronic apparatus.

The determining may include, if a number of an operation corresponding to the test code being performed in the external electronic apparatus within a certain time after the test code is received again is more than a certain number, determining an IR code set including the test code as an IR code set corresponding to the external electronic apparatus.

The command to map the determined IR code set to the remote control apparatus may include at least one of the determined IR code set including the test code and identification information of the external electronic apparatus corresponding to the determined IR code set including the test code.

According to the above-described various exemplary embodiments, the electronic apparatus may transmit an IR code set corresponding to an identified external electronic apparatus to a remote control apparatus so that a user may control the external electronic apparatus through the remote control apparatus.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
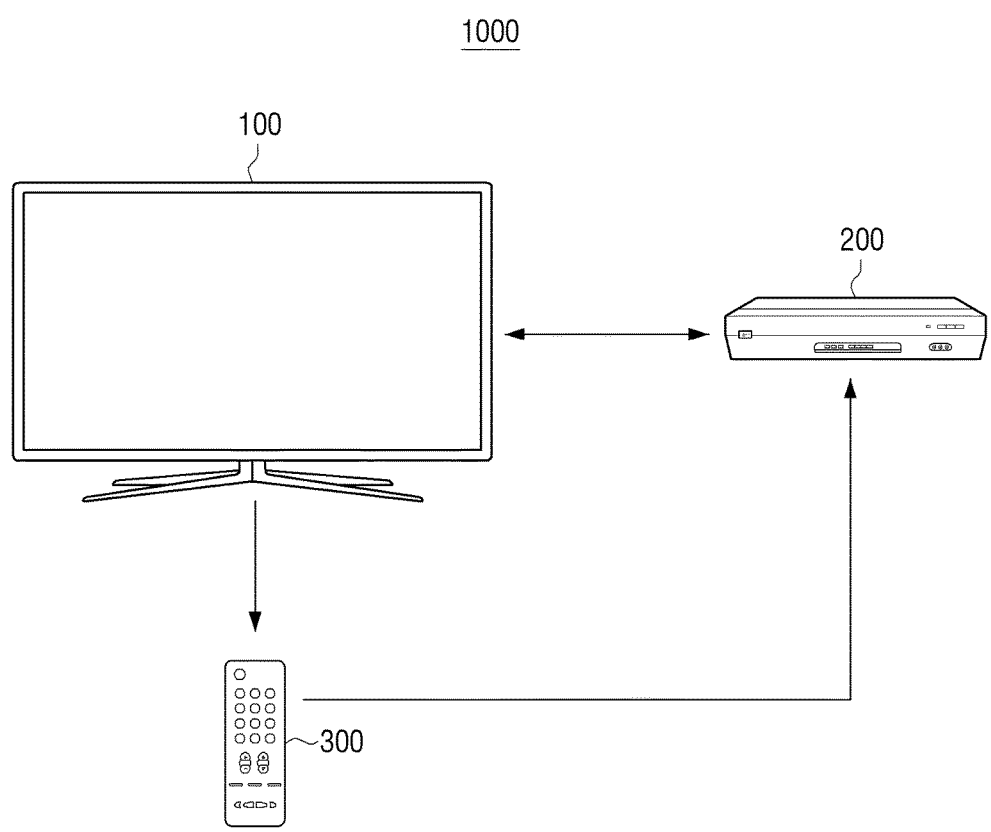
FIG. 1 is a view of an electronic system according to an exemplary embodiment.

Certain exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

FIG. 1 is a view of an electronic system 1000 according to an exemplary embodiment. Referring to FIG. 1, the electronic system 1000 includes an electronic apparatus 100, one or more external electronic apparatuses 200, and a remote control apparatus 300, e.g., a remote controller.

As illustrated in FIG. 1, the electronic apparatus 100 may include a digital television (TV), but is not limited thereto. The electronic apparatus 100 may include various types of apparatus providing a display function, such as a personal computer (PC), smart phone, tablet PC, portable music player (PMP), personal digital assistant (PDA), navigation device, etc. Hereinafter, for convenience of explanation, it is assumed that the electronic apparatus 100 is a digital TV.

The electronic apparatus 100 may store a plurality of IR code sets corresponding to a plurality of external electronic apparatuses. In particular, the electronic apparatus 100 may store a plurality of infrared (IR) code sets corresponding to external electronic apparatuses connected to the electronic apparatus 100 and a plurality of IR code sets corresponding to a plurality of external electronic apparatuses not connected to the electronic apparatus 100.

The IR code set may be a code for controlling the external electronic apparatus 200 through the remote control apparatus 300. The electronic apparatus 100 may be manufactured with a plurality of IR code sets stored therein. In addition, the electronic apparatus 100 may periodically receive and be updated with a new IR code set. The new IR code set may be an IR code set corresponding to the newly manufactured external electronic apparatus 200.

The electronic apparatus 100 may perform communication with at least one external electronic apparatus 200 among a plurality of external electronic apparatuses. If the electronic apparatus 100 is a digital TV, the electronic apparatus 100 may receive contents from the external electronic apparatus 200 and display the contents. In addition, the electronic apparatus 100 may perform communication with two or more of a plurality of external electronic apparatuses.

The electronic apparatus 100 may receive and provide various information from the external electronic apparatus 200. For example, the electronic apparatus 100 may receive at least one of video data and audio data from the external electronic apparatus 200 and provide the data to a user.

The electronic apparatus 100 may perform communication with the remote control apparatus 300. The electronic apparatus 100 may map an IR code set to the remote control apparatus 300 by transmitting the IR code set to the remote control apparatus 300. The electronic apparatus 100 may perform communication with the remote control apparatus 300 using Bluetooth. However, this is only an example, and the electronic apparatus 100 may perform communication with the remote control apparatus 300 using other communication standards.

The electronic apparatus 100 may sense that an operation corresponding to a test code included in one of a plurality of IR code sets has been performed in the external electronic apparatus 200 according to a predetermined event. The predetermined event may be an event in which a user controls the external electronic apparatus 200. However, an exemplary embodiment is not limited thereto.

The test code may be an IR code that the electronic apparatus 100 transmits to the remote control apparatus 300 to identify the external electronic apparatus 200. As another example, the test code may be an IR code transmitted by another remote control apparatus exclusively for the external electronic apparatus 200 to control the external electronic apparatus 200.

The test code is a volume control code, and the electronic apparatus 100 may sense that an operation corresponding to the volume control code has been performed in the external electronic apparatus 200. For example, the test code may be a mute command code, and the electronic apparatus 100 may sense that the external electronic apparatus 200 connected to the electronic apparatus 100 is muted. However, this is only an example, and the test code may be a volume up code or a volume down code. As another example, the test code may be a channel change code or the like.

When an operation corresponding to a test code is performed in the external electronic apparatus 200, the electronic apparatus 100 may determine an IR code set including the test code as an IR code set corresponding to the external electronic apparatus 200. In other words, the electronic apparatus 100 may determine that the test code is an IR code for controlling the external electronic apparatus 200 as the external electronic apparatus 200 performs an operation corresponding to the test code. The electronic apparatus 100 may search an IR code set including the test code among a plurality of stored IR code sets and determine the IR code set as an IR code set corresponding to the external electronic apparatus 200.

For example, if the test code senses that the test code is a volume control code of DVD player B of manufacturer A, and that the electronic apparatus 100 has adjusted the volume of the DVD player B of the manufacturer A, the electronic apparatus 100 may search an IR code set including the test code and determine the IR code set as an IR code set corresponding to the DVD play B of the manufacturer A.

The electronic apparatus 100 may transmit a command to map the determined IR code set to the remote control apparatus 300 to the remote control apparatus. The command to map the determined IR code set to the remote control apparatus 300 may include at least one of the determined IR code set including the test code and identification information of the external electronic apparatus 200 corresponding to the determined IR code set including the test code.

The external electronic apparatus 200 may be a broadcast receiving apparatus such as a set-top box, etc. As another example, the external electronic apparatus 200 may be a DVD player, etc., but is not limited thereto, and the external electronic apparatus 200 may be any apparatus that can provide contents to the electronic apparatus 100.

The external electronic apparatus 200 does not include identification information regarding the external electronic apparatus 200. As another example, the external electronic apparatus 200 may include identification information regarding the external electronic apparatus 200, but does not transmit the identification information to the electronic apparatus 100. Hereinafter, it is assumed that the electronic apparatus 100 receives only contents while there is no identification information of the external electronic apparatus 200 available to the electronic apparatus 100, regardless of whether the external electronic apparatus 200 includes identification information or not. In other words, it is assumed that the electronic apparatus 100 may receive and provide contents from the external electronic apparatus 200, but there is no information as to the model and/or the manufacturer of the external electronic apparatus 200.

If the IR code transmitted from the remote control apparatus 300 is a control command corresponding to the external electronic apparatus 200, the external electronic apparatus 200 may operate according to the control command. However, if the IR code is not a control command corresponding to the external electronic apparatus 200, the external electronic apparatus 200 does not perform any operation.

The remote control apparatus 300 may be an integrated remote controller. For example, the remote control apparatus 300 does not store information for controlling another apparatus when it was initially purchased. Thereafter, the remote control apparatus 300 may store information for controlling another apparatus and control another apparatus. For example, the remote control apparatus 300 may store an IR code set for controlling the electronic apparatus 100 and the external electronic apparatus 200 and control the electronic apparatus 100 and the external electronic apparatus 200.

The remote control apparatus 300 may map the IR code set received from the electronic apparatus 100. For example, the electronic apparatus 100 may transmit an IR code set for controlling DVD player B from manufacturer A to the remote control apparatus 300, and the remote control apparatus 300 may map the received IR code set to control the DVD player B.

The remote control apparatus 300 may map the received IR code set to a button provided on the remote control apparatus 300. However, this is only an example, and if the remote control apparatus 300 includes a touchable display, the remote control apparatus 300 may display a screen including a graphical user interface (GUI) element corresponding to the received IR code set.

The remote control apparatus 300 may map IR code sets corresponding to a plurality of apparatuses to each mode. For example, if the remote control apparatus 300 is in a first mode, the electronic apparatus 100 may be controlled, and if the remote control apparatus 300 is in a second mode, the external electronic apparatus may be controlled. In this case, the remote control apparatus 300 does not map an IR code set to a plurality of mode buttons.

The remote control apparatus 300 may receive only a test code from the electronic apparatus 100 and transmit an IR code corresponding to the test code. For example, the remote control apparatus 300 may receive a mute command code, as a test code, of the DVD player B of the manufacturer A from the electronic apparatus 100 and transmit a corresponding IR code to the external electronic apparatus. In this case, if the DVD player B of the manufacturer A is located within a distance capable of receiving the IR code of the remote control apparatus 300, the DVD player B of the manufacturer A may perform the mute operation according to the received IR code. If the DVD player B of the manufacturer A is connected to the electronic apparatus 100, the electronic apparatus 100 may determine that the DVD player B of the manufacturer A has performed an operation corresponding to the test code. Accordingly, the electronic apparatus 100 may determine that it is possible to control the DVD player B of the manufacturer A using the test code transmitted to the remote control apparatus 300.

The remote control apparatus 300 may transmit an IR code through unidirectional wireless communication. The unidirectional wireless communication may include any existing communication technologies such as Infrared Data Association and all future unidirectional wireless communication technologies.

Through the above-identified method, the electronic apparatus 100 may identify the external electronic apparatus 200 and map an IR code set corresponding to the external electronic apparatus 200 to the remote control apparatus 300. Accordingly, a user may control the external electronic apparatus 200 through the remote control apparatus 300.

Figure 2A:
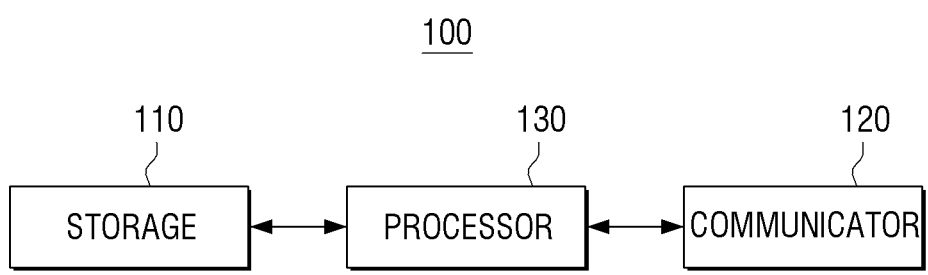
FIGS. 2A and 2B are block diagrams illustrating configuration of an electronic apparatus according to an exemplary embodiment.
Figure 2B:
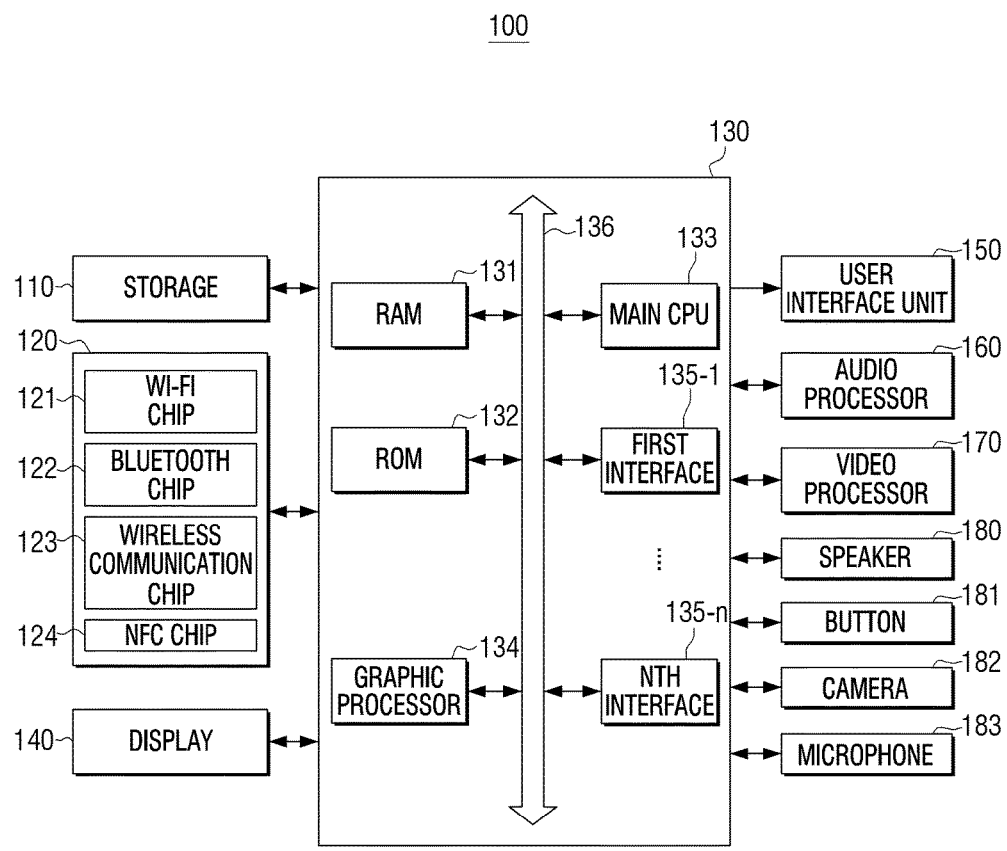

FIGS. 2A and 2B are block diagrams illustrating configuration of the electronic apparatus 100 according to an exemplary embodiment.

As illustrated in FIG. 2A, the electronic apparatus 100 includes a storage 110, e.g., a memory or a storage device, a communicator 120, e.g., a communication interface and/or a transceiver, and a processor 130, e.g., one or more microprocessors.

The storage 110 may store a plurality of IR code sets corresponding to a plurality of external electronic apparatuses. The IR code sets are a set of IR codes corresponding to the control commands that the external electronic apparatus 200 can receive. In other words, if an IR code set regarding the specific external electronic apparatus 200 is used, all control commands supported by the specific external electronic apparatus 200 can be generated based on the IR code set.

The storage 100 stores a plurality of sets of IR codes classified by type, manufacturer and model of the external electronic apparatus 200 as a database (DB). The storage 110 may store an IR code set for controlling the electronic apparatus 100. The storage 100 may include a storage medium in the electronic apparatus 100 and an external storage medium, for example, a removable disk including a USB memory, a web server through a network, or the like.

The communicator 120 may perform communication with the external electronic apparatus 200. Specifically, the communicator 120 may receive video data, audio data, etc. from the external electronic apparatus 200. For example, the communicator 120 may perform communication with the external electronic apparatus 200 using HDMI. The communicator 120 may perform communication with a plurality of external electronic apparatuses. The electronic apparatus 100 may be connected to a plurality of external electronic apparatuses using different communication standards.

The communicator 120 may perform communication with the external control apparatus 300. Specifically, the communicator 120 may transmit an IR code set, a test code and a signal for controlling the remote control apparatus 300 to the remote control apparatus 300. For example, the communicator 120 may perform communication with the remote control apparatus 300 using Bluetooth. The communicator 120 may receive an IR code transmitted from the remote control apparatus 300.

The communicator 120 may be configured to communicate with the external electronic apparatus 200 and to communicate with the remote control apparatus 300 separately. However, this is only an example, and the communicator 120 may be provided in one integrated configuration.

The communicator 120 may perform unidirectional communication or bidirectional communication with an apparatus connected to the electronic apparatus 100. Further, the communicator 120 may perform communication with the external electronic apparatus 200 and the remote control apparatus 300 using wired and/or wireless LAN, WAN, Ethernet, Bluetooth, ZigBee, IEEE 1394, Wi-Fi, Power Line Communication (PLC), etc.

When an operation corresponding to a test code included in one of a plurality of IR code sets is performed in the external electronic apparatus 200, the processor 130 may determine an IR code set including the test code as an IR code set corresponding to the external electronic apparatus 200 and transmit a command to map the determined IR code set to the remote control apparatus 300, to the remote control apparatus 300, according to a predetermined event. The processor 130 may transmit a command to map the determined IR code set to each button of the remote control apparatus 300 to the remote control apparatus 300.

For example, the test code is a volume control code, and when an operation corresponding to a volume control code is performed in the external electronic apparatus 200, the processor 130 may determine an IR code set including the volume control code as an IR code set corresponding to the external electronic apparatus 200.

Depending on the type of a predetermined event, the processor 130 determines whether to transmit the test code to the remote control apparatus 300. As a first example, if the predetermined event is an event in which the external electronic apparatus 200 is connected the electronic apparatus and an event in which a user command to identify the external electronic apparatus 200 connected to the electronic apparatus 100 is received, the processor 130 may transmit the test code to the remote control apparatus 300.

As a second example, if the predetermined event is an event in which a test code is received from another remote control apparatus, the processor 130 does not transmit the test code to the remote control apparatus 300, as described in detail below.

First, in a case where the processor 130 transmits a test code to the remote control apparatus 300, if a predetermined event occurs, the processor 130 may transmit the test code to the remote control apparatus 300, and if an operation corresponding to the test code is performed in the external electronic apparatus 200, the processor 130 may transmit a signal for executing a control command corresponding to the test code along with the test code included in one of a plurality of IR code sets to the remote control apparatus 300.

For example, if a predetermined event occurs, the processor 130 may transmit a mute command code to the remote control apparatus 300. The remote control apparatus 300 may receive the mute command code and transmit a corresponding IR code. The external electronic apparatus 200 may receive the IR code transmitted from the remote control apparatus 300 and perform the mute operation. The processor 130 may sense that the volume of the audio data received from the external electronic apparatus 200 has changed and determine that the operation corresponding to the mute command code is performed in the external electronic apparatus 200. The processor 130 may determine an IR code set including the mute command code as an IR code set corresponding to the external electronic apparatus 200 and transmit a command to map the determined IR code set to the remote control apparatus 300, to the remote control apparatus 300. The remote control apparatus 300 may map the received IR code set to a specific mode, and if the remote control apparatus 300 operates in a corresponding mode after the mapping, may transmit an IR code for controlling the external electronic apparatus 200.

The processor 130 may transmit a test code included in one of a plurality of IR code sets to the remote control apparatus 300, and if an operation corresponding to the test code is not performed in the external electronic apparatus 200, may transmit a test code included in another one of the plurality of IR code sets to the remote control apparatus 300.

For example, if volume of the audio data received from the external electronic apparatus 200 does not change according to the above-described mute command code, the processor 130 may determine that the operation corresponding to the mute command code has not been performed in the external electronic apparatus 200.

For example, the processor 130 may transmit the test code to the remote control apparatus 300, and determine whether the operation corresponding to the test code is performed in the external electronic apparatus 200 within a predetermined time. For example, if the operation corresponding to the test code is not performed in the external electronic apparatus 200 within one second after the test code is transmitted to the remote control apparatus 300, the processor 130 may determine that the operation corresponding to the test code has not been performed in the external electronic apparatus 200.

If the operation corresponding to the test code is not performed in the external electronic apparatus 200, the processor 130 may transmit a test code included in another one of the plurality of IR code sets to the remote control apparatus 300. The test code included in another one of the plurality of IR code sets may be a test code which is the same type as the test code initially transmitted but may be different in terms of at least one of type, manufacturer, and model.

For example, if the external electronic apparatus 200 does not perform the corresponding operation according to the mute command code of manufacturer A, the processor 130 may transmit the mute command code of manufacturer B to the remote control apparatus 300.

The processor 130 may transmit test codes of the same kind in the plurality of stored IR code sets sequentially to the remote control apparatus 300 until the operation corresponding to the test code is performed in the external electronic apparatus 200. Accordingly, the processor 130 may determine an IR code set corresponding to the external electronic apparatus 200.

However, this is only an example, and the processor 130 may transmit a plurality of test codes to the remote control apparatus 300. For example, the processor 130 may transmit ten volume control codes at once, and the remote control apparatus 300 may transmit the IR codes at predetermined time intervals. The electronic apparatus 100 may determine a test code corresponding to the external electronic apparatus 200 according to a point of time when the operation corresponding to the volume control code is performed, and determine an IR code set including the test code.

If the operation corresponding to the test code is performed in the external electronic apparatus 200, the processor 130 may retransmit the test code to the remote control apparatus 300, and if the corresponding operation according to the retransmission of the test code is performed more than a predetermined number of times, may determine an IR code set including the test code as an IR code set corresponding to the external electronic apparatus 200.

For example, if a predetermined event occurs, the processor 130 may transmit a mute command code to the remote control apparatus 300. The processor 130 may sense that the volume of the audio data received from the external electronic apparatus 200 has changed, and determine that the external electronic apparatus 200 performs the operation corresponding to the mute command code. Subsequently, the processor 130 may transmit the same mute command code to the remote control apparatus 300 again, and may sense that the volume of the audio data received from the external electronic apparatus 200 has changed.

The processor 130 may repeat the above process, and if the number of times that the volume of the audio data received from the external electronic apparatus 200 is changed is more than a predetermined number, may determine an IR code set including the test code as an IR code set corresponding to the external electronic apparatus 200.

The processor 130 may determine an IR code set corresponding to the external electronic apparatus 200 more accurately by repeating the above operation. For example, if the mute command code does not correspond to the external electronic apparatus 200, the external electronic apparatus 200 does not perform the mute operation even if the IR code is received. However, if there is no sound in the audio data of the external electronic apparatus 200 at the time when the IR code is transmitted to the external electronic apparatus 200 from the remote control apparatus 300, the processor 130 may still determine that the external electronic apparatus 200 has operated according to the mute command code. Accordingly, by the above-discussed repetition process, it is possible to prevent an occurrence of an error.

Meanwhile, a case where the predetermined event is an event in which a test code is received from another remote control apparatus will be described. The processor 130 does not transmit a test code to the remote control apparatus 300.

If the operation corresponding to a test code is performed in the external electronic apparatus 200 within a predetermined time after the test code is received from another remote control apparatus, the processor 130 may determine an IR code set including the test code an as an IR code set corresponding to the external electronic apparatus 200. In other words, if the test code is received from another remote control apparatus, the processor 130 may sense whether the operation corresponding to the test code is performed in the external electronic apparatus 200 within a predetermined time. Here, another remote control apparatus may be a remote control apparatus for controlling the external electronic apparatus 200.

For example, the processor 130 may receive a mute control code from another remote control apparatus. The processor 130 may sense that the volume of the audio data received from the external electronic apparatus 200 has changed within a predetermined time after the mute command code is received, and determine that the external electronic apparatus 200 performs the operation corresponding to the mute control code.

The processor 130 determines an IR code set corresponding to the received test code among a plurality of stored IR code sets, and may transmit a command to map the determined IR code set to the remote control apparatus 300, to the remote control apparatus 300.

If the above-described operation is repeated, the processor 130 may transmit a command to map the IR code set to the remote control apparatus 300, to the remote control apparatus 300.

In other words, if the number of times that the operation corresponding to the test code is performed in the external electronic apparatus within a predetermined time after the test code is received again is more than a predetermined number of times, the processor 130 may determine an IR code set including the test code as an IR code set corresponding to the external electronic apparatus 200, and transmit a command to map the determined IR code set to the remote control apparatus 300, to the remote control apparatus 300.

Through the above repetitive operation, the processor 130 may determine the IR code set corresponding to the external electronic apparatus 200 more accurately. The detailed description is the same as described above and, therefore, further description will not be provided.

As such, according to the first example, when the external electronic apparatus 200 is connected to the electronic apparatus 100 or when a user wishes to identify the external electronic apparatus 200, a longer time to identify the external electronic apparatus 200 may be needed. For example, in the case of using the mute command code, the mute command code corresponding to the external electronic apparatuses may be repeatedly searched for and transmitted.

According to the second example, a user may use another remote control apparatus matchingly corresponding to the external electronic apparatus 200, and the electronic apparatus 100 stores the related information and identifies the external electronic apparatus 200.

The command to map the determined IR code set to the remote control apparatus 300 may include at least one of the determined IR code set including the test code and identification information of the external electronic apparatus 200 corresponding to the determined IR code set including the test code.

For example, if the remote control apparatus 300 does not store information regarding a plurality of IR code sets, the processor 130 may transmit the determined IR code set including the test code to the remote control apparatus 300.

If the remote control apparatus 300 stores information regarding a plurality of IR code sets, the processor 130 may transmit the identification information of the external electronic apparatus 200 corresponding to the determined IR code set including the test code to the remote control apparatus 300. The remote control apparatus 300 may map the IR code set corresponding to the identification information.

If an IR code set is already mapped to the remote control apparatus 300 even if the processor 130 transmits a command to map the determined IR code set to the remote control apparatus 300, to the remote control apparatus 300, the remote control apparatus 300 may transmit information that the IR code set is already mapped, to the electronic apparatus 100. Once the information that the IR code set is already mapped is received, the processor 130 may provide a user with the information that the IR code set is already mapped to the remote control apparatus 300 and inquire whether the corresponding information is deleted, etc. As another example, the processor 130 may inquire whether to map to another mode of the remote control apparatus 300.

FIG. 2B is a block diagram illustrating an example of detained configuration of the electronic apparatus 100. Referring to FIG. 2B, the electronic apparatus 100 includes the storage 110, the communicator 120, the processor 130, a display 140, a user interface unit 150, an audio processor 160, a video processor 170, a speaker 180, a button 181, a camera 182, and a microphone 183. The elements of FIG. 2B overlapped with the elements of FIG. 2A will not be specifically explained below.

The processor 130 controls the overall operations of the electronic apparatus 100 using various programs stored in the storage 110.

Specifically, the processor 130 includes a random-access memory (RAM) 131, a read-only memory (ROM) 132, a main central processing unit (CPU) 133, a graphic processor 134, a first to an n-th interface 135-1 to 135-*n* and a bus 136.

The RAM 131, the ROM 132, the main CPU 133, the graphic processor 134, the first to the n-th interface 135-1 to 135-*n*, etc. may be connected to each other through the bus 136.

The first through n-th interfaces 135-1 through 135-*n* are connected to various types of elements as described above. One of the interfaces may be a network interface which is connected with an external device via a network.

The main CPU 133, by accessing the storage 110, performs booting using the O/S stored in the storage 110. Then, the main CPU 274 performs various operations using various programs, contents, data, etc. stored on the storage 110.

The ROM 132 stores a command set and the like for system booting. If a turn on command is input and thus power is supplied, the main CPU 133 copies the O/S stored in the storage 110 to the RAM 131 and executes the O/S according to the command stored in the ROM 132, thereby booting the system. If the booting is completed, the main CPU 133 copies various application programs stored in the storage 110 to the RAM 131 and executes the application programs copied to the RAM 131, thereby performing various operations.

The graphic processor 134 generates a screen including various types of objects such as an icon, an image, a text, and the like by using an operator and a renderer. The computation unit (not illustrated) computes an attribute value, such as a coordinate value where each object is displayed, a form, a size, a color, and the like, according to a screen layout using a received control command. The rendering unit (not illustrated) generates a screen of various layouts including objects including an attribute value calculated in the computation unit (not illustrated). The screen created by the renderer may be displayed in a display region of the display 140.

The operation of the above-described processor 130 may be performed by a program stored in the storage 110.

The storage unit 110 may store a variety of data, such as an operating system (OS) software module for operating the electronic apparatus 100, an identification module of the external electronic apparatus 200, a control module of the remote control apparatus 300, etc.

The processor 130 may identify the external electronic apparatus 200 based on information stored in the storage 110, and map the IR code set corresponding to the external electronic apparatus 200 to the remote control apparatus 300.

The communicator 120 is an element to perform communication with various types of external devices according to various types of communication methods. The communicator 120 includes a Wi-Fi chip 121, a Bluetooth chip 122, a wireless communication chip 123, and an NFC chip 124, etc. The processor 130 performs communication with various external apparatuses using the communicator 120.

The Wi-Fi chip 121 and the Bluetooth chip 122 may perform communication using a Wi-Fi method and a Bluetooth method, respectively. In the case of using the Wi-Fi chip 121 or the Bluetooth chip 122, connection information such as a service set identifier (SSID) and a session key may be received and transmitted first, and communication may be connected using the connection information, and then, various information may be received and transmitted. The wireless communication chip 123 indicates a chip which performs communication in accordance with various communication standards such as IEEE, ZigBee, 3rd generation (3G), 3rd generation partnership project (3GPP), and long term evolution (LTE) or the like. The NFC chip 124 may refer to a chip that operates in a NFC manner using a frequency band of 13.56 MHz among various RF-ID frequency bands such as 135 kHz, 13.56 MHz, 433 MHz, 860 to 960 MHz, and 2.45 GHz.

The display 140 may display information received from the external electronic apparatus 200. The display 140 may include a liquid crystal display (LCD) panel, an organic light emitting diode (OLED) display, a plasma display panel (PDP), etc., but is not limited thereto. The display 140 may include a transparent display, a flexible display, etc.

The user interface 150 receives various user interactions. The user interface unit 150 may be implemented in various forms depending on the implementation examples of the electronic apparatus 100. If the electronic apparatus 100 is a digital TV, the user interface unit 150 may include a remote control receiver which receives a remote control signal from the remote control apparatus 300, a camera which senses a user motion, a microphone which receives a user voice, a button, etc. As another example, if the electronic apparatus 100 is a touch-based electronic apparatus, the user interface unit 150 may include a touch screen which has an inter-layer structure with respect to a touch pad. The user interface 150 may be used as the above-described display 140.

The touch sensor (not illustrated) may include a capacitive sensor or a resistive sensor. The capacitive sensor calculates a touch coordinates by sensing micro-electricity excited by a user body when part of the user body touches a display screen using a dielectric coated on the display surface. The resistive sensor includes two electrode plates embedded in the electronic apparatus 100, and calculates a touch coordinates as the upper and lower plates of the touched point contact with each other to sense flowing electric current when a user touches a screen. In addition, an infrared detecting method, a surface acoustic wave method, an integral strain gauge method, a piezo electric method, etc. may be used to detect a touch interaction.

The audio processor 160 is an element that performs processing with respect to audio data. The audio processor 160 may perform various processing such as decoding, amplification, noise filtering, etc. with respect to audio data.

The video processor 170 performs processing with respect to video data. The video processor 170 may perform various image processing, such as decoding, scaling, noise filtering, frame rate conversion, resolution conversion, etc. with respect to video data.

The speaker 180 outputs various audio data processed by the audio processor 160 and various notification sounds or voice messages, etc.

The button 181 may include various types of buttons, such as a mechanical button, a touch pad, a wheel, etc., which are formed on the front, side, or rear of the exterior of a main body.

The camera 182 photographs a still image or a moving image according to a user's control. The camera 182 may include a plurality of cameras such as front camera and back camera.

The microphone 183 receives a user voice or other sounds and converts the user voice or other sounds into audio data.

Hereinafter, basic configuration and various example embodiments will be described for better understanding.

Figure 3:
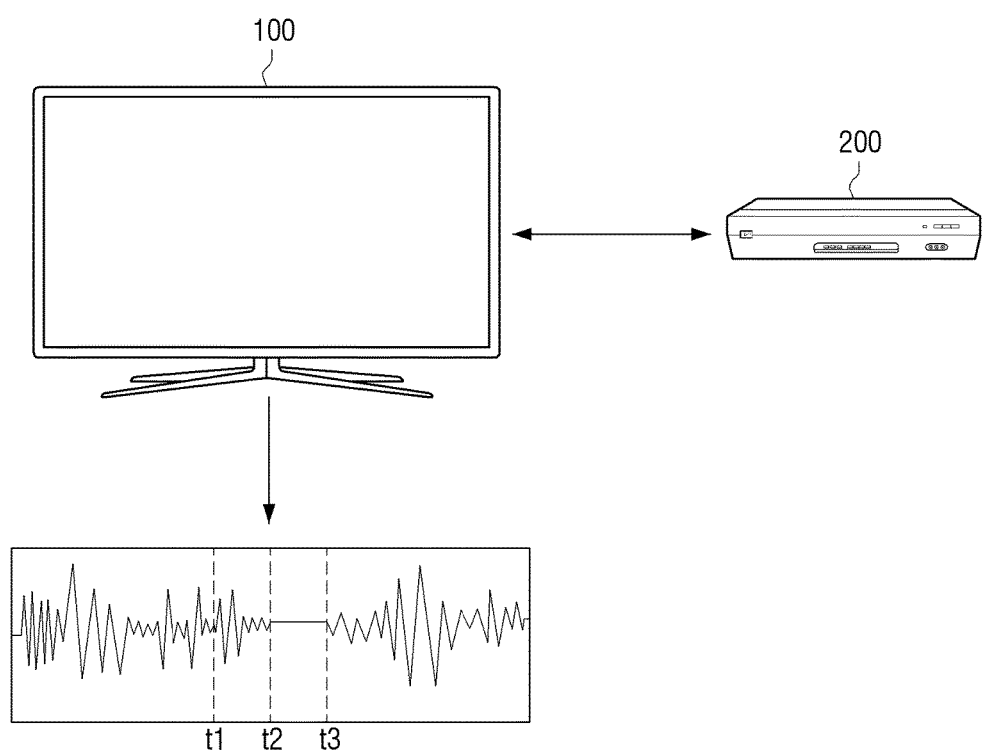
FIG. 3 is a view illustrating a volume control code according to an exemplary embodiment.

FIG. 3 is a view of a case where a test code is a volume control code according to an exemplary embodiment.

As illustrated in FIG. 3, the processor 130 may sense audio data received from the external electronic apparatus 200 in real time. For example, the processor 130 may sense a change in audio data received from the external electronic apparatus 200 after a volume control code is transmitted to the remote control apparatus 300.

The processor may transmit a mute control code to the remote control apparatus 300 at the time of t1, and sense that the external electronic apparatus 200 has been muted from the time t2 to the time t3.

For example, the processor 130 may send a signal to execute a mute command cancel code to the remote control apparatus 300 after a predetermined time has elapsed along with the mute command code at the time of t1. As another example, the processor 130 may transmit the mute command code to the remote control apparatus 300 at a time of t1, and may transmit the mute command cancel code to the remote control apparatus 300 after a predetermined time has elapsed. Accordingly, as shown in FIG. 3, the external electronic apparatus 200 is muted from the time t2 to the time t3, so that the user's viewing disturbance can be minimized. However, this is only an example, and the processor 130 may transmit only the mute command code to the remote control apparatus 300, and the external electronic apparatus 200 may be continuously muted after the time t2.

The processor 130 may sense a change in audio data received from the external electronic apparatus 200 only for a predetermined time from the time of t1. For example, the processor 130 may sense a change in audio data received from the external electronic apparatus 200 only for one second from the time of t1.

Further, the processor 130 may determine that the audio data received from the external electronic apparatus 200 has changed only when the time from t2 to t3 is more than a predetermined time. For example, the processor 130 may determine that the audio data received from the external electronic apparatus 200 has changed only when the time from t2 to t3 is more than one second.

Accordingly, if the operation corresponding to the volume control code is performed in the external electronic apparatus 200, the processor 130 may determine an IR code set including the volume control code as an IR code set corresponding to the external electronic apparatus 200.

Figure 4A:
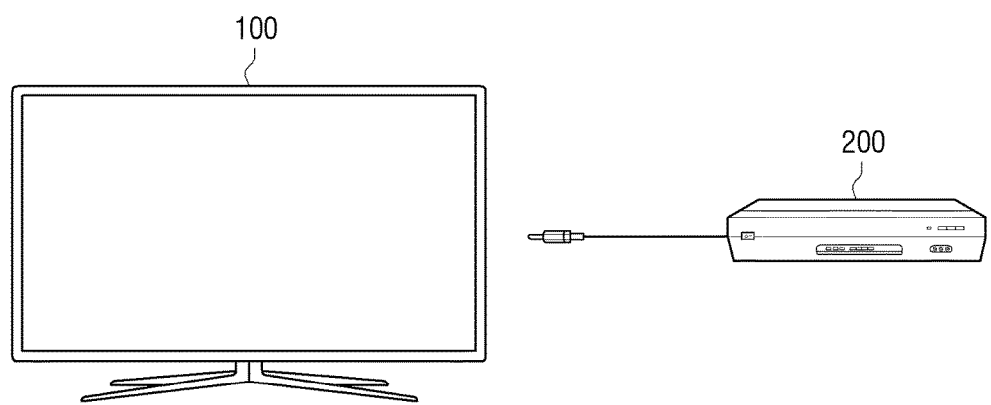
FIGS. 4A and 4B are views of a portion of an electronic system according to an exemplary embodiment.
Figure 4B:
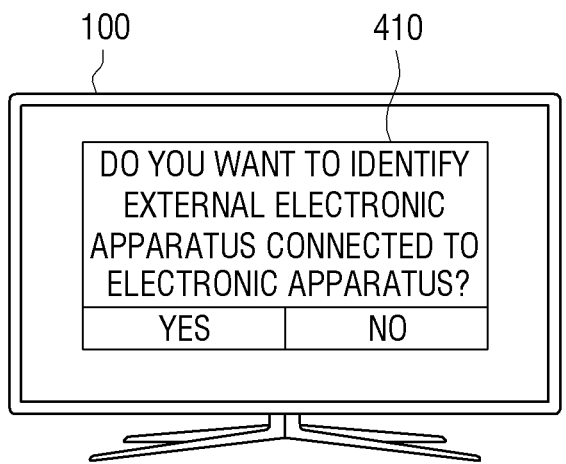

FIGS. 4A and 4B are views of a predetermined event according to an exemplary embodiment.

As illustrated in FIG. 4A, if an event in which the external electronic apparatus 200 is connected to the electronic apparatus 100 occurs, the processor 130 may transmit the test code to the remote control apparatus 300, and if the operation corresponding to the test code is performed in the external electronic apparatus 200, determine an IR code set including the test code as an IR code set corresponding to the external electronic apparatus 200.

For example, if an event in which the external electronic apparatus 200 having no identification information is connected to the electronic apparatus 100, the processor 130 may transmit the test code to the remote control apparatus 300 to identify the external electronic apparatus 200.

For example, in a case where the external electronic apparatus 200 does not have identification information or where the external electronic apparatus 200 does have identification information but cannot share the identification information because the manufacturer of the external electronic apparatus 200 is different from that of the electronic apparatus 100, etc., when an event in which the external electronic apparatus 200 is connected to the electronic apparatus 100 occurs, the processor 130 may perform the operation for identifying the external electronic apparatus 200.

As illustrated in FIG. 4B, if an event in which a user command to identify the external electronic apparatus 200 connected to the electronic apparatus 100 is received occurs, the processor 130 may transmit the test code to the remote control apparatus 300, and if the operation corresponding to the test code is performed in the external electronic apparatus 200, determine an IR code set including the test code as an IR code set corresponding to the external electronic apparatus 200.

The processor 130 may display a confirmation message 410, "Would you like to identify the external electronic apparatus connected to the electronic apparatus?". If there is a user confirmation, the processor 130 may transmit the test code to the remote control apparatus 300 to identify the external electronic apparatus 200.

Figure 5:
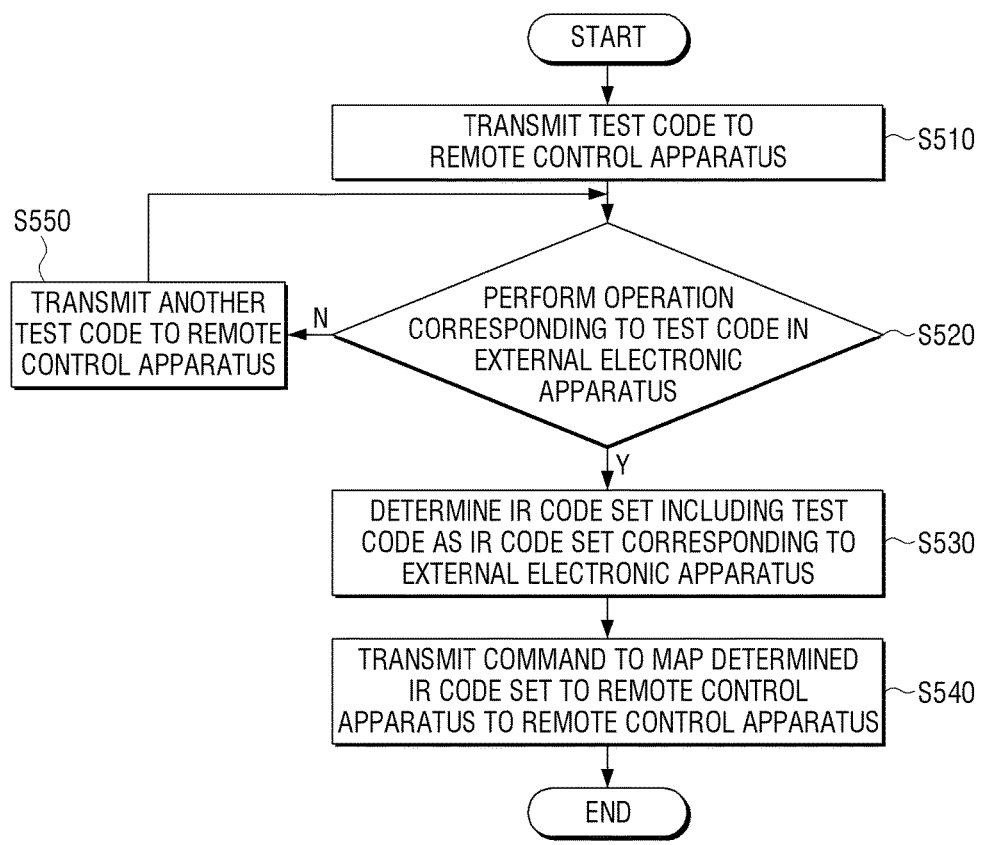
FIG. 5 is a flowchart of a method according to an exemplary embodiment.

FIG. 5 is a flowchart of a case in which the external electronic apparatus 200 does not perform the operation corresponding to the test code according to an exemplary embodiment.

As illustrated in FIG. 5, if a predetermined event occurs, the processor 130 may transmit the test code to the remote control apparatus 300 (operation S510). The processor 130 may transmit a signal for executing a control command corresponding to the test code to the remote control apparatus 300 along with the test code included in one of a plurality of IR code sets.

The processor 130 senses whether the operation corresponding to the test code is performed in the external electronic apparatus 200 (operation S520).

If the operation corresponding to the test code is performed in the external electronic apparatus 200, the processor 130 may determine that an IR code set including the test code as an IR code set corresponding to the external electronic apparatus 200 (operation S530), and transmit a command to map the determined IR code set to the remote control apparatus 300, to the remote control apparatus 300 (operation S540).

If the operation corresponding to the test code is not performed in the external electronic apparatus 200, the processor 130 transmits another test code to the remote control apparatus 300 (operation S550), and senses whether the operation corresponding to the test code is performed in the external electronic apparatus 200 again (operation S520).

The another test code may be a test code which is the same type as the initially-transmitted test code, but may be different in terms of at least one of type, manufacturer and model.

The processor 130 may determine a test code according to a predetermined sequence among a plurality of test codes of the same type and transmit the test code to the remote control apparatus 300. For example, the processor 130 may transmit a test code to the remote control apparatus 300 in alphabetical order of the product name.

By repeating the above process, the processor 130 may determine the test code corresponding to the external electronic apparatus 200.

Figure 6:
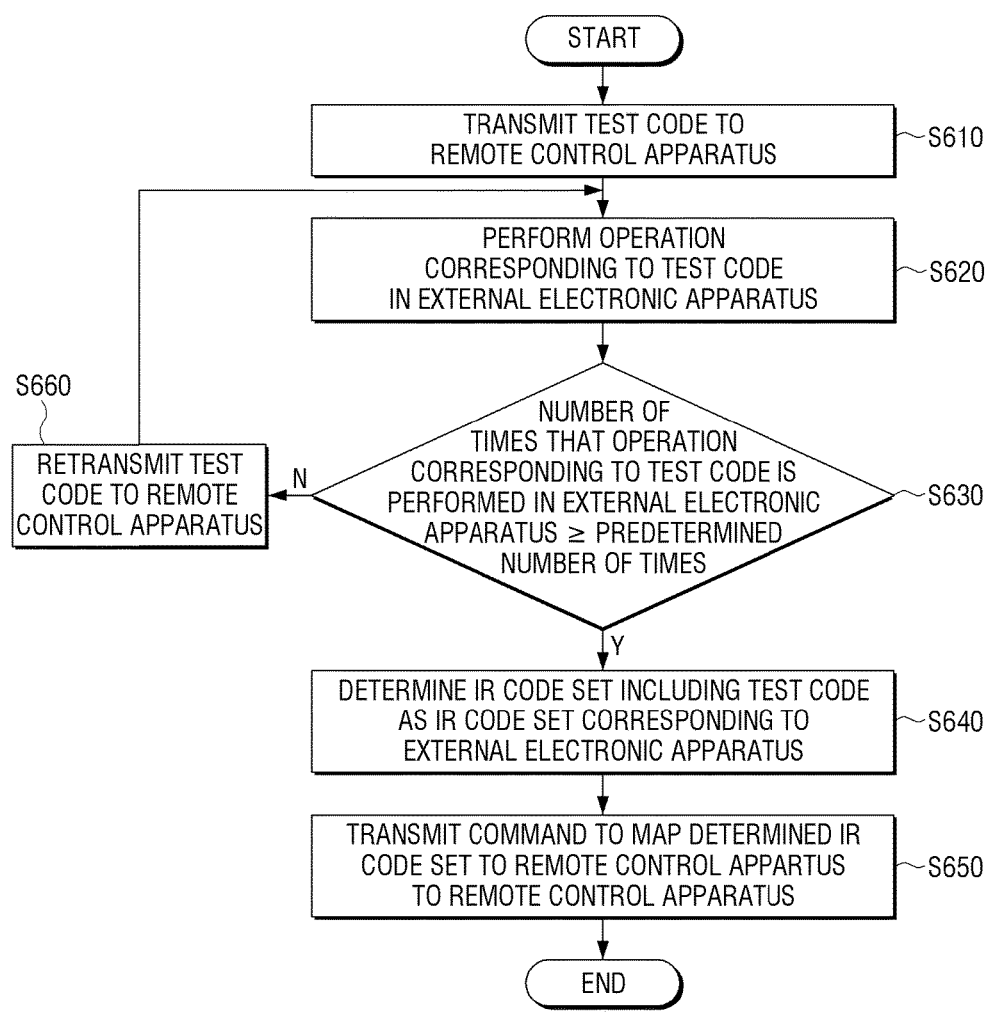
FIG. 6 is a flowchart of a method according to an exemplary embodiment.

FIG. 6 is a flowchart of a method of reconfirming a test code corresponding to the external electronic apparatus 200 according to an exemplary embodiment.

As illustrated in FIG. 6, if a predetermined event occurs, the processor 130 may transmit a test code to the remote control apparatus 300 (operation S610). The external electronic apparatus 200 performs the operation corresponding to the test code (operation S620), and the processor 130 determines whether the number of times that the external electronic apparatus 200 performs the operation corresponding to the test code is more than a predetermined number of times (operation S630).

If the number of times that the external electronic apparatus 200 performs the operation corresponding to the test code is more than a predetermined number of times, the processor 130 may determine an IR code set including the test code as an IR code set corresponding to the external electronic apparatus 200 (operation S640), and transmit a command to map the determined IR code set to the remote control apparatus 300, to the remote control apparatus 300 (operation S650).

If the number of times that the external electronic apparatus 200 performs the operation corresponding to the test code is not more than a predetermined number of times, the processor 130 may retransmit the test code to the remote control apparatus 300 (operation S660), and determine again whether the number of times that the external electronic apparatus 200 has performed the operation corresponding to the test code is more than a predetermined number of times (operation S630). The retransmitted test code is the same as the test code which was transmitted initially.

By repeating the above process, the processor 130 may lower the probability of error occurrence by reconfirming the test code corresponding to the external electronic apparatus 200.

Figure 7:
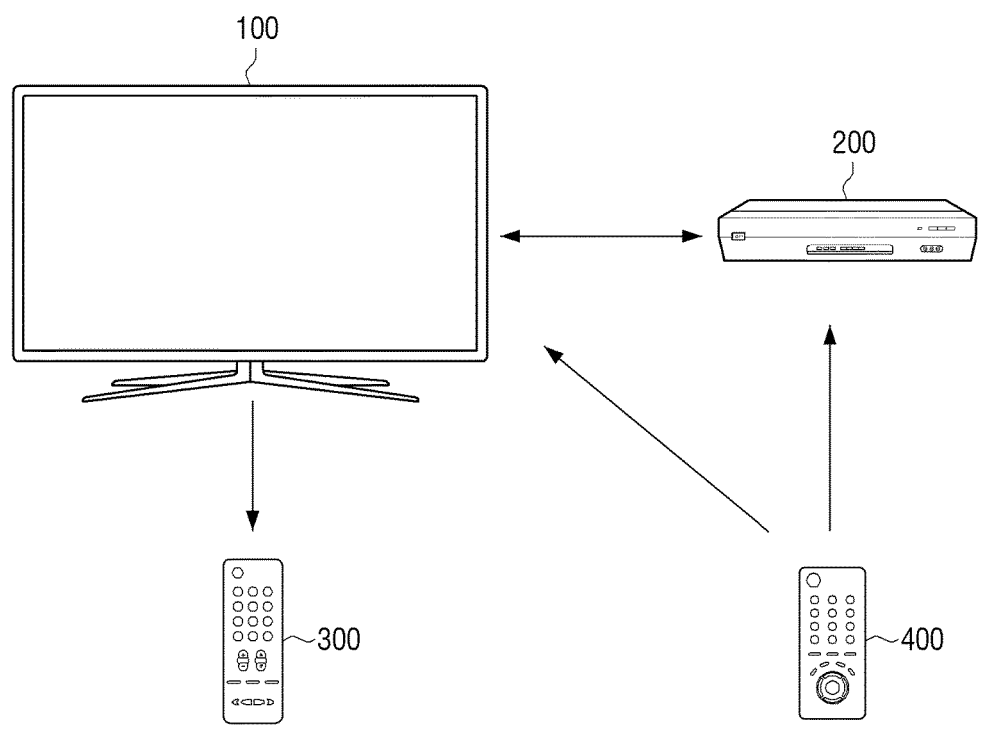
FIG. 7 is a view of an electronic system according to an exemplary embodiment.

FIG. 7 is a view of a method of using another remote control apparatus 400 according to an exemplary embodiment.

As illustrated in FIG. 7, if the operation corresponding to the test code is performed in the external electronic apparatus 200 within a predetermined time after the test code is received from another remote control apparatus 400, the processor 130 may determine an IR code set including the test code as an IR code set corresponding to the external electronic apparatus 200.

Here, another remote control apparatus 400 may be a remote control apparatus exclusively for the external electronic apparatus 200. In other words, when another remote control apparatus 400 is used, the external electronic apparatus 200 can be controlled without any setting.

Similarly to the remote control apparatus 300, another remote control apparatus 400 may transmit the test code through unidirectional wireless communication. The test code transmitted from another remote control apparatus 400 can be received by the electronic apparatus 100.

The processor 130 may sense whether the operation corresponding to the test code is performed in the external electronic apparatus 200 within a predetermined time after the test code is received. For example, the processor 130 may sense whether the operation corresponding to the test code is performed in the external electronic apparatus 200 within one second after the test code is received, and if the corresponding operation is not performed within one second, the processor 130 may stop sensing the operation of the external electronic apparatus 200.

The test code may be a volume control code, and the if the volume control code is received and the volume of the sound data received from the external electronic apparatus 200 is changed within a predetermined time, the processor 130 may determine an IR code set including the volume control code as an IR code set corresponding to the external electronic 200. The processor 130 may transmit a command to map the determined IR code set to the remote control apparatus 300, to the remote control apparatus 300.

Through the above-described operation, the processor 130 may map the IR code set for controlling the external electronic apparatus 200 to the remote control apparatus 300 without interfering with the viewing of a user. After the IR code set for controlling the external electronic apparatus 200 is mapped to the remote control apparatus 300, the user does not use another remote control apparatus 400. If the IR code set for a plurality of external electronic apparatuses 200 is mapped to the remote control apparatus 300, the user may control the plurality of external electronic apparatuses using one remote control apparatus 300.

Figure 8:
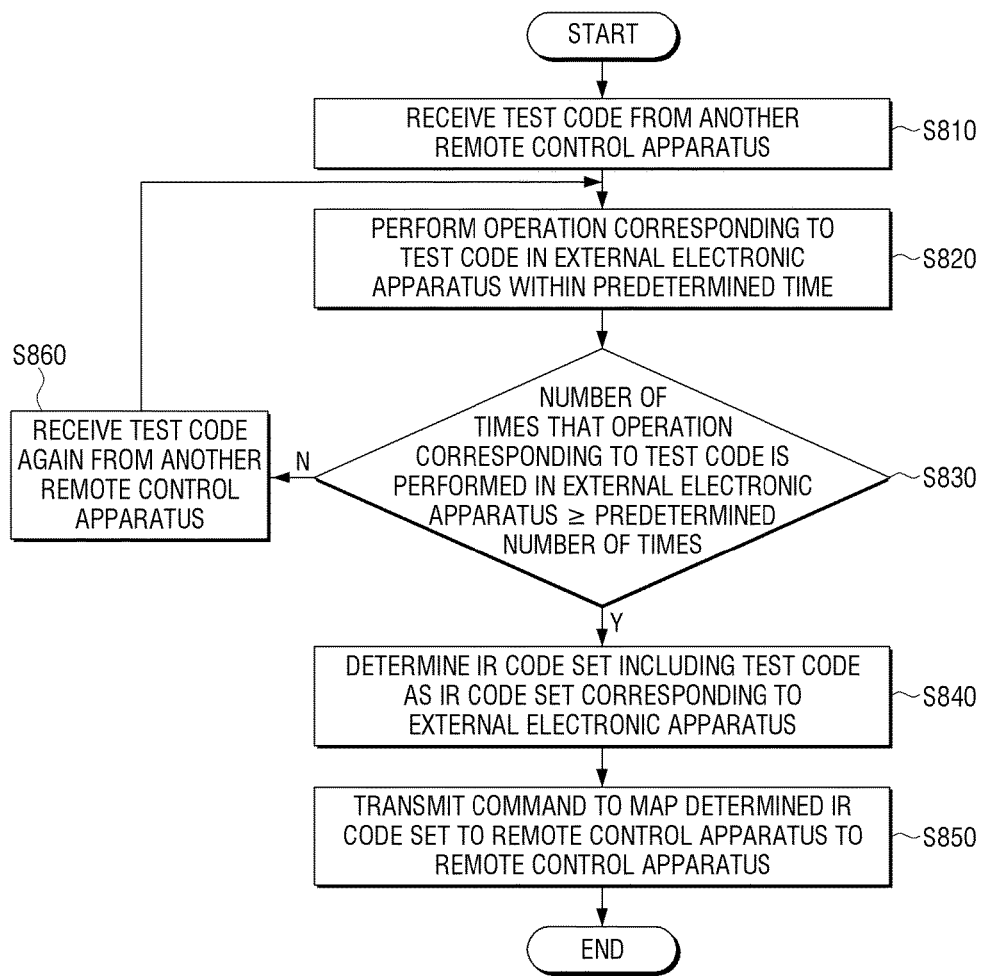
FIG. 8 is a flowchart of a method according to an exemplary embodiment.

FIG. 8 is a flowchart of a method of reconfirming a test code received from another remote control apparatus 400 according to an exemplary embodiment.

As illustrated in FIG. 8, the processor 130 may receive a test code from another remote control apparatus 400 (operation S810). If the operation corresponding to the test code is performed in the external electronic apparatus 200 within a predetermined time after the test code is received (operation S820), the processor 130 determines whether the number of times that the operation corresponding to the test code is performed in the external electronic apparatus 200 is more than a predetermined number of times (operation S830).

If the number of times that the operation corresponding to the test code is performed in the external electronic apparatus 200 is more than a predetermined number of times, the processor 130 may determine an IR code set including the test code as an IR code set corresponding to the external electronic apparatus 200 (operation S840), and transmit a command to map the determined IR code set to the remote control apparatus 300, to the remote control apparatus 300 (operation S850).

If the number of times that the operation corresponding to the external electronic apparatus 200 is not more than a predetermined number of times, the processor 130 does not perform any operation. Subsequently, if the test code is received again from another remote control apparatus 400 (operation S860), the processor 130 may determine whether the number of times that the external electronic apparatus 200 performs the operation corresponding to the test code is more than a predetermined number of times again (operation S630). The test code which is received again is the same as the test code which was received initially.

By repeating the above process, the processor 130 may lower the probability of error occurrence by reconfirming the test code received from another remote control apparatus 400.

Figure 9:
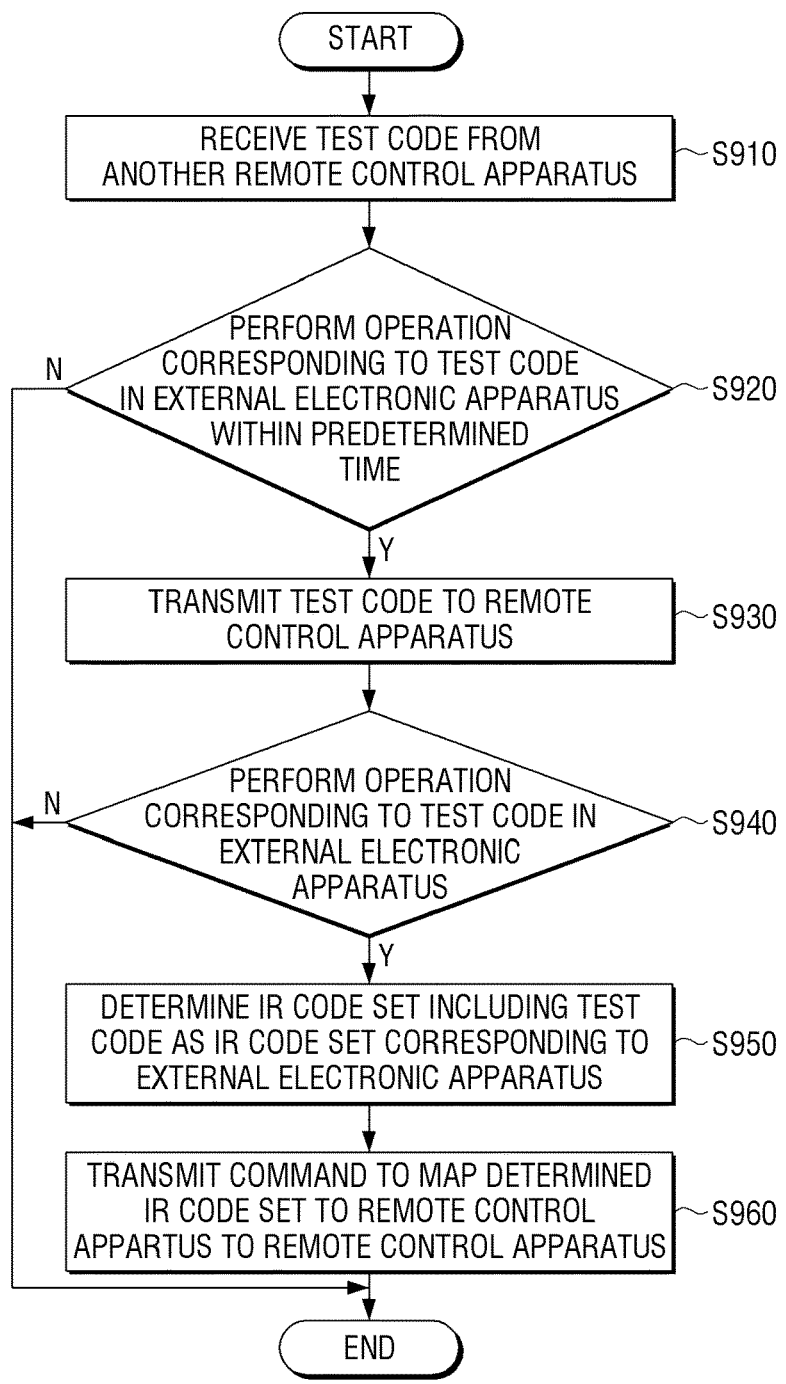
FIG. 9 is a flowchart of a method according to an exemplary embodiment.

FIG. 9 is a flowchart of a method of reconfirming a test code received from another remote control apparatus 400 according to an exemplary embodiment.

As illustrated in FIG. 9, the processor 130 may receive a test code from another remote apparatus 400 (operation S910). The processor 130 may determine whether the operation corresponding to the test code is performed in the external electronic apparatus 200 within a predetermined time after the test code is received (operation S920). If the operation corresponding to the test code is not performed in the external electronic apparatus 200, the processor 130 does not perform any operation.

If the operation corresponding to the test code is performed in the external electronic apparatus 200, the processor 130 may transmit the test code to the remote control apparatus 300 (operation S930). The processor 130 may transmit a signal for executing a control command corresponding to the test code along with the test code to the remote control apparatus 300.

The processor 130 may determine whether the operation corresponding to the test code is performed in the external electronic apparatus 200 (operation S940). If the operation corresponding to the test code is not performed in the external electronic apparatus 200, the processor 130 does not perform any operation.

If the operation corresponding to the test code is performed in the external electronic apparatus 200, the processor 130 may determine an IR code set including the test code as an IR code set corresponding to the external electronic apparatus 200 (operation S950), and transmit a command to map the determined IR code set to the remote control apparatus 300, to the remote control apparatus 300 (operation S960).

In the case of using the above-described method, it is possible to avoid repetitive operations for checking the test code one by one, unlike in an exemplary embodiment of FIG. 5. In addition, in comparison with FIG. 8, there is no need to wait for the same test code to be input from another remote control apparatus 400 and thus, the identification time can be reduced. The processor 130 may lower the probability of error occurrence by reconfirming the test code received from another remote control apparatus 400 through the remote control apparatus 300.

Figure 10:
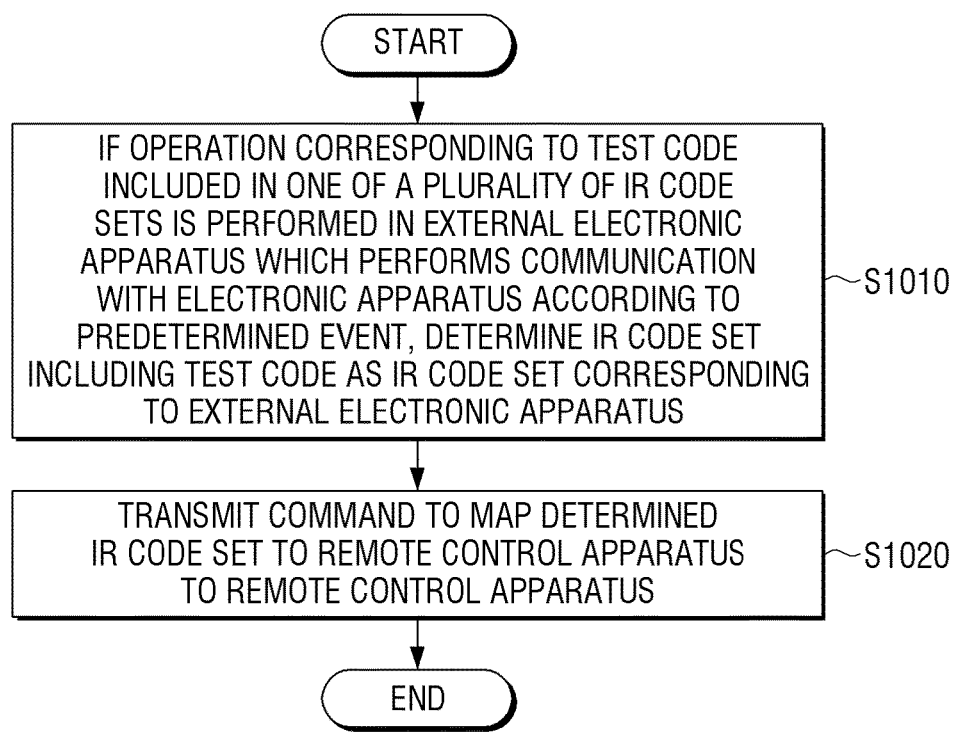
FIG. 10 is a flowchart of a method of an electronic apparatus according to an exemplary embodiment.

FIG. 10 is a flowchart of a controlling method of an electronic apparatus according to an exemplary embodiment.

First, if an operation corresponding to a test code included in one of a plurality of IR code sets is performed in an external electronic apparatus which performs communication with an electronic apparatus according to a predetermined event, an IR code set including the test code is determined as an IR code set corresponding to the external electronic apparatus (operation S1010). The electronic apparatus may store a plurality of IR code sets corresponding a plurality of external electronic apparatuses.

Subsequently, a command to map the determined IR code set to the remote control apparatus is transmitted to the remote control apparatus (operation S1020).

For example, the test code is a volume control code, and the determining (operation S1010) includes, if the operation corresponding to the volume control code is performed in the external electronic apparatus, determining an IR code set including the volume control code as an IR code set corresponding to the external electronic apparatus.

If a predetermined event occurs, the step of transmitting the test code to the remote control apparatus is further included, and the determining (operation S1010) includes, if the operation corresponding to the test code is performed in the external electronic apparatus is performed, determining an IR code set including the test code as an IR code set corresponding to the external electronic apparatus.

If the operation corresponding to the test code is not performed in the external electronic apparatus, the step of transmitting a test included in one of a plurality of IR code sets to the remote control apparatus may be further included.

The determining (operation S1010) may include, if the operation corresponding to the test code is performed in the external electronic apparatus, retransmitting the test code to the remote control apparatus, and if the operation corresponding to the retransmission of the test code is performed more than a predetermined times, determining an IR code set including the test code as an IR code set corresponding to the external electronic apparatus.

The step of transmitting the test code to the remote control apparatus includes transmitting a signal for executing a control command corresponding to the test code along with the test code included in one of the plurality of IR test codes to the remote control apparatus.

The predetermined event may be at least one of an event in which the external electronic apparatus is connected to the electronic apparatus and an event in which a user command to identify the external electronic apparatus connected to the electronic apparatus is received.

The step of receiving a test code from another remote control apparatus may be further included, and the determining (operation S1010) may include, if the operation corresponding to the test code is performed in the external electronic apparatus within a predetermined time, determining an IR code set including the test code as an IR code set corresponding to the external electronic apparatus.

The determining (operation S1010) includes, if the number of times that the operation corresponding to the test code is performed in the external electronic apparatus within a predetermined time after the test code is received again is more than a predetermined number of times, determining an IR code set including the test code as an IR code set corresponding to the external electronic apparatus.

The command to map the determined IR code set to the remote control apparatus may include at least one of an IR code set including the determined test code and identification information of an external electronic apparatus corresponding to the IR code set including the determined test code.

According to the above-described various exemplary embodiments, an electronic apparatus transmits an IR code set corresponding to an identified external electronic apparatus to a remote control apparatus so that a user may control the external electronic apparatus through the remote control apparatus.

In the above-described exemplary embodiments, an external electronic apparatus is identified using a volume control code, but an exemplary embodiment is not limited thereto. For example, an external electronic apparatus may be identified using a resolution control code, etc.

The methods according to various exemplary embodiments may be programmed and stored in various storage media. Accordingly, the methods according to the above-described exemplary embodiments may be implemented in various types of electronic apparatuses which execute the storage media.

Specifically, a non-transitory computer-readable medium where a program for performing the above-described controlling method sequentially may be provided.

The non-transitory computer-readable medium is a medium that stores data semi-permanently rather than storing data for a very short time, such as a register, a cache, a memory, etc., and is readable by an apparatus. Specifically, the above-described various applications or programs may be stored and provided in a non-transitory computer-readable medium such as a CD, a DVD, a hard disk, a Blu-ray disk, a universal serial bus (USB), a memory card, a ROM, or the like.

Communication between the respective components in the display apparatus may be performed through a bus. Each device may further include a processor such as a CPU, a microprocessor, or the like that performs the above-described various steps.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:
1. An electronic apparatus comprising:
a storage;
a communicator; and
a processor configured to:
in response to a certain event occurring, control the communicator to transmit, to a remote control apparatus, a volume control code included in one of a plurality of infrared (IR) code sets corresponding to a plurality of external electronic apparatuses stored in the storage,
in response to an external electronic apparatus among the plurality of external electronic apparatuses performing an operation corresponding to the volume control code, obtain an IR code set including the volume control code as the IR code set corresponding to the external electronic apparatus, and
control the communicator to transmit, to the remote control apparatus, a command to map the obtained IR code set to the remote control apparatus,
wherein the processor is further configured to transmit another volume control code included in another one of the plurality of IR code sets, to the remote control apparatus, in response to the external electronic apparatus not performing the operation corresponding to the volume control code which was previously transmitted.

2. The electronic apparatus as claimed in claim 1, wherein the processor is further configured to retransmit the volume control code to the remote control apparatus, in response to the external electronic apparatus performing the operation corresponding to the volume control code, and confirm the IR code set as the IR code set corresponding to the external electronic apparatus, in response to the external electronic apparatus performing the operation more than a certain number of times after the volume control code is retransmitted.

3. The electronic apparatus as claimed in claim 1, wherein the processor is further configured to transmit to the remote control apparatus a signal for executing a control command corresponding to the volume control code together with the volume control code.

4. The electronic apparatus as claimed in claim 1, wherein the certain event is at least one among an event in which the external electronic apparatus is connected to the electronic apparatus and an event in which a user command to identify the external electronic apparatus connected to the electronic apparatus is received.

5. The electronic apparatus as claimed in claim 1, wherein the volume control code is received from another remote control apparatus, and
the processor is further configured to determine the IR code set as the IR code set corresponding to the external electronic apparatus, in response to the external electronic apparatus performing the operation corresponding to the volume control code within a certain time after the volume control code is received from the another remote control apparatus.

6. The electronic apparatus as claimed in claim 5, wherein the volume control code is received again from the another remote control apparatus, and
the processor is further configured to confirm the IR code set as the IR code set corresponding to the external electronic apparatus, in response to a number of times, that the external electronic apparatus performs the operation corresponding to the volume control code, being more than a certain number, within a certain time after the volume control code is received again.

7. The electronic apparatus as claimed in claim 1, wherein the command to map the IR code set to the remote control apparatus includes at least one among the IR code set and identification information of the external electronic apparatus corresponding to the IR code set.

8. A controlling method of an electronic apparatus which stores a plurality of infrared (IR) code sets corresponding to a plurality of external electronic apparatuses, the controlling method comprising:
in response to a certain event occurring, transmitting, to a remote control apparatus, a volume control code included in one of the plurality of IR code sets;
in response to an external electronic apparatus among the plurality of external electronic apparatuses performing an operation corresponding to the volume control code, obtaining an IR code set including the volume control code as the IR code set corresponding to the external electronic apparatus;
transmitting, to the remote control apparatus, a command to map the obtained IR code set to the remote control apparatus; and
transmitting another volume control code included in another one of the plurality of IR code sets to the remote control apparatus, in response to the operation corresponding to the volume control code, which was previously transmitted, not being performed in the external electronic apparatus.

9. The controlling method as claimed in claim 8, wherein the obtaining comprises retransmitting the volume control code to the remote control apparatus, in response to the operation corresponding to the volume control code being performed in the external electronic apparatus; and confirming the IR code set as the IR code set corresponding to the external electronic apparatus, in response to the operation being performed more than a certain number of times after the volume control code is retransmitted.

10. The controlling method as claimed in claim 8, wherein the transmitting the volume control code to the remote control apparatus comprises:
transmitting to the remote control apparatus a signal for executing a control command corresponding to the volume control code together with the volume control code.

* * * * *